United States Patent [19]

Swisher, Jr. et al.

[11] 3,917,084

[45] Nov. 4, 1975

[54] COMBINATION BOTTOM DUMP AND REAR DISCHARGE TRAILER

[75] Inventors: George W. Swisher, Jr., Oklahoma City; Michael F. Hopkins, Bethany; Robert K. Gepfert, Del City, all of Okla.

[73] Assignee: CMI Corporation, Oklahoma City, Okla.

[22] Filed: Apr. 18, 1973

[21] Appl. No.: 352,339

[52] U.S. Cl.......... 214/83.26; 105/282 R; 214/307; 298/27
[51] Int. Cl.²......................................... B60P 1/00
[58] Field of Search............... 214/83.26, 307, 83.18, 214/83.2; 298/28, 27, 37; 222/486, 485, 559, 222/561; 105/282 R

[56] References Cited
UNITED STATES PATENTS

| | | | |
|---|---|---|---|
| 688,357 | 12/1901 | Statler | 105/282 R |
| 1,610,759 | 12/1926 | Downing, Jr. | 222/559 |
| 1,613,051 | 1/1927 | Napier | 298/27 |
| 2,256,705 | 9/1941 | Delivuk | 298/27 |
| 2,275,799 | 3/1942 | Oklejas | 214/83.26 |
| 2,303,033 | 11/1942 | Elliott | 298/28 |
| 2,541,008 | 2/1951 | Stahmer et al. | 222/486 |
| 2,757,808 | 8/1956 | Mendez | 214/83.26 |
| 3,032,239 | 5/1961 | Whitley, Jr. et al. | 222/486 |
| 3,298,745 | 1/1967 | Czapiewski | 298/37 |

*Primary Examiner*—Robert J. Spar
*Assistant Examiner*—Donald W. Underwood
*Attorney, Agent, or Firm*—Dunlap & Codding

[57] ABSTRACT

A trailer assembly including a frame assembly including wheels mounted on the rear portion, a hitch mounted on the forward portion for securing the trailer assembly to suitable tractive means, and a hopper carried intermediate the hitch and the wheels having an opening formed in the bottom portion thereof. The trailer assembly further includes gate means carried by the frame assembly and communicating with the opening in the bottom portion of the hopper for alternately opening and closing the opening. The trailer assembly further includes conveyor means removably securable to the frame assembly and having a forward portion positionable beneath the gate means and a rear portion positionable above and to the rear of the wheel means for conveying the contents of the hopper to the rear of the trailer frame assembly when the gate means is opening the bottom portion of the hopper. The conveyor means includes a rigid frame with an endless conveyor belt mounted thereon and driven by a suitable power unit such as a hydraulic motor also carried thereon. The trailer assembly also includes a means for removably securing the conveyor means to the frame assembly whereby the conveyor means may be detached from the frame assembly so that contents of the hopper may be dumped downwardly from the hopper to the ground when the gate means is opening the bottom portion of the hopper. Novel forms of the gate means are disclosed for metering the desired amount of discharge from the hopper onto the conveyor means.

4 Claims, 18 Drawing Figures

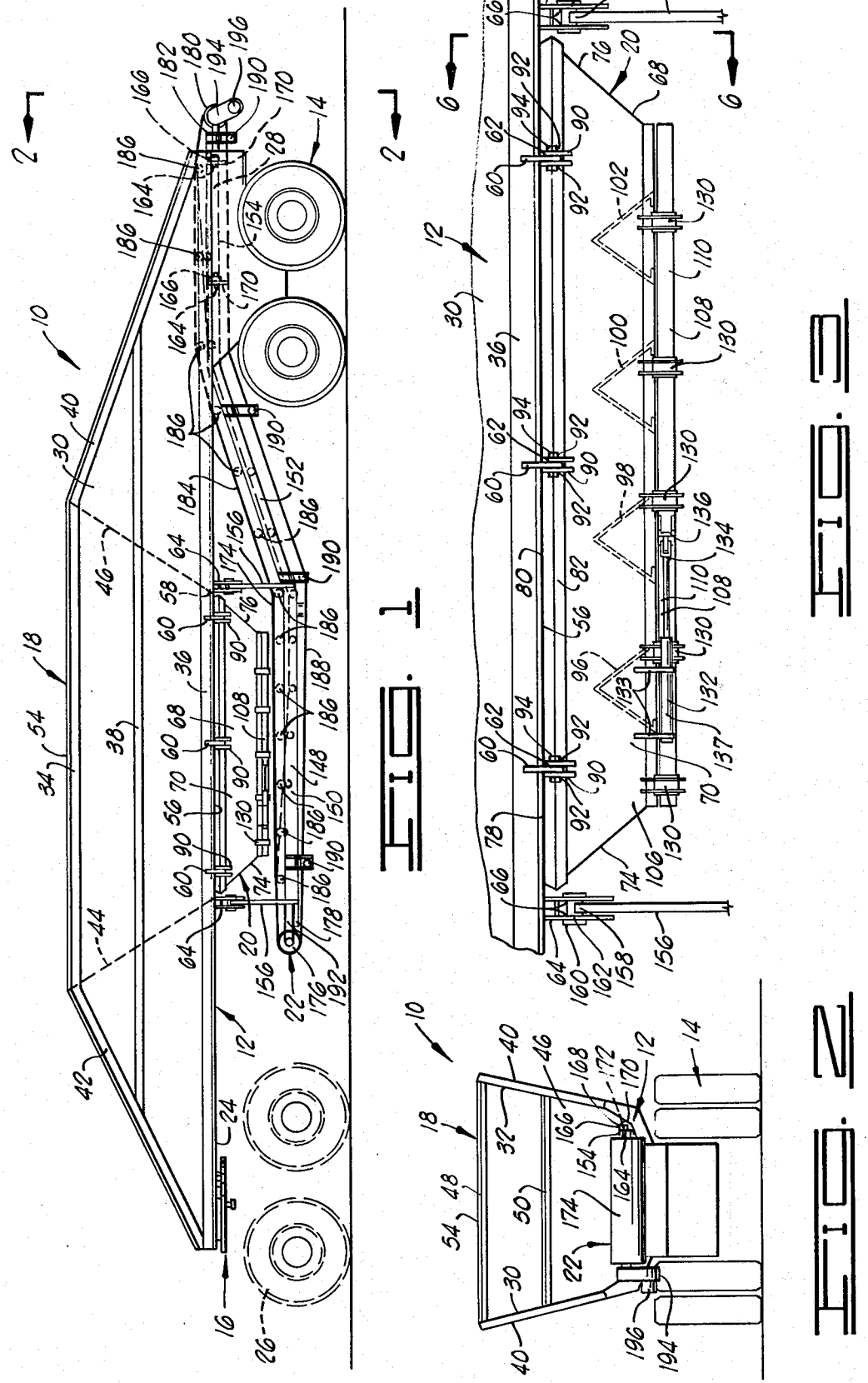

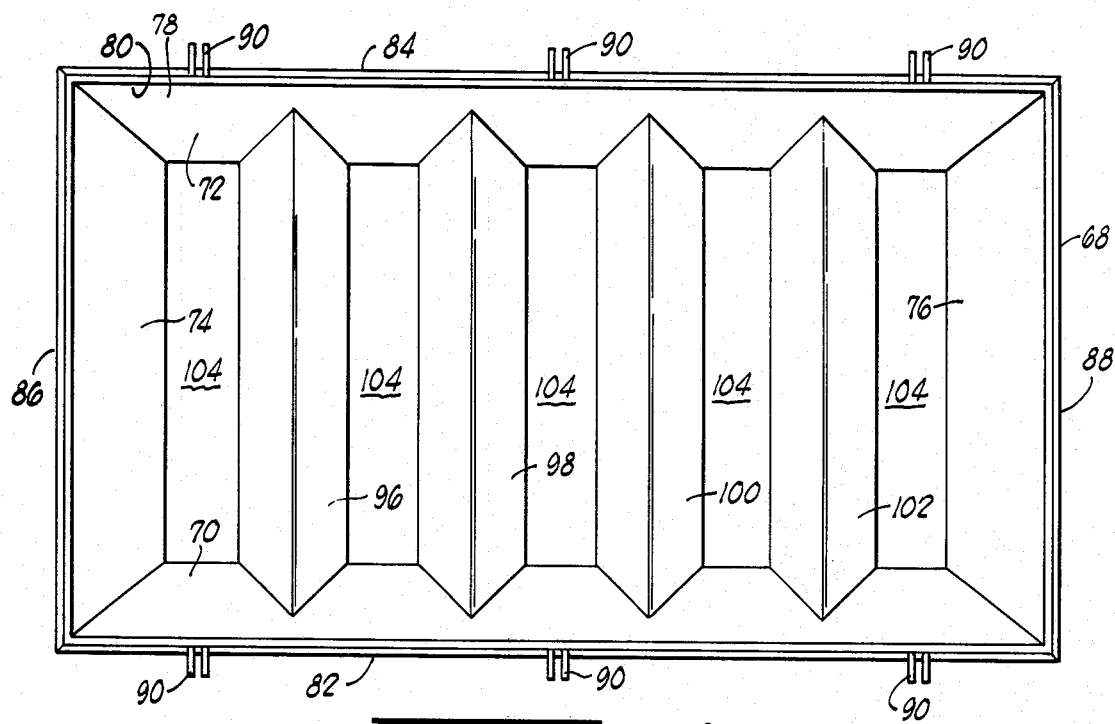
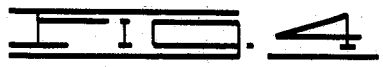
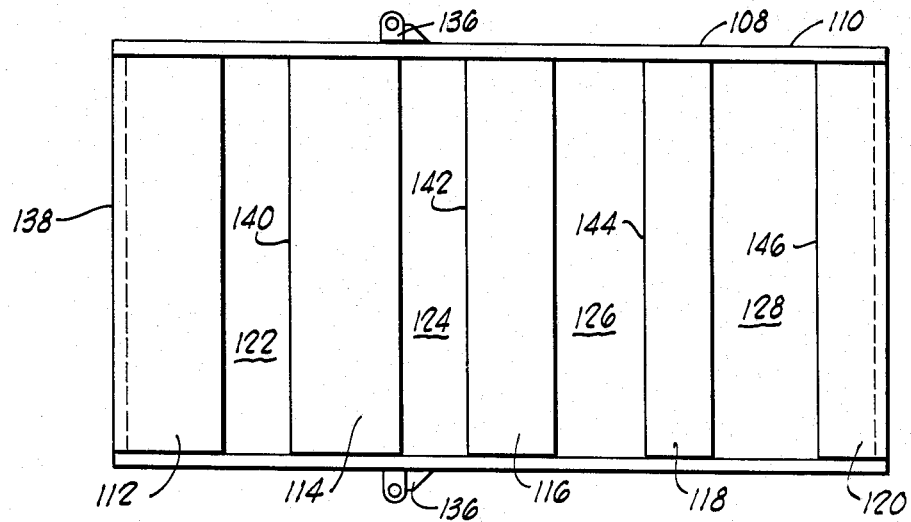
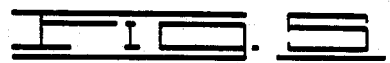
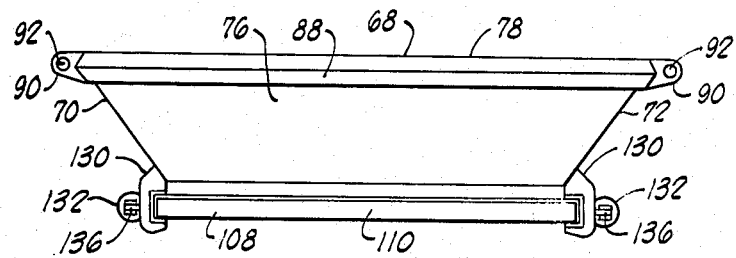

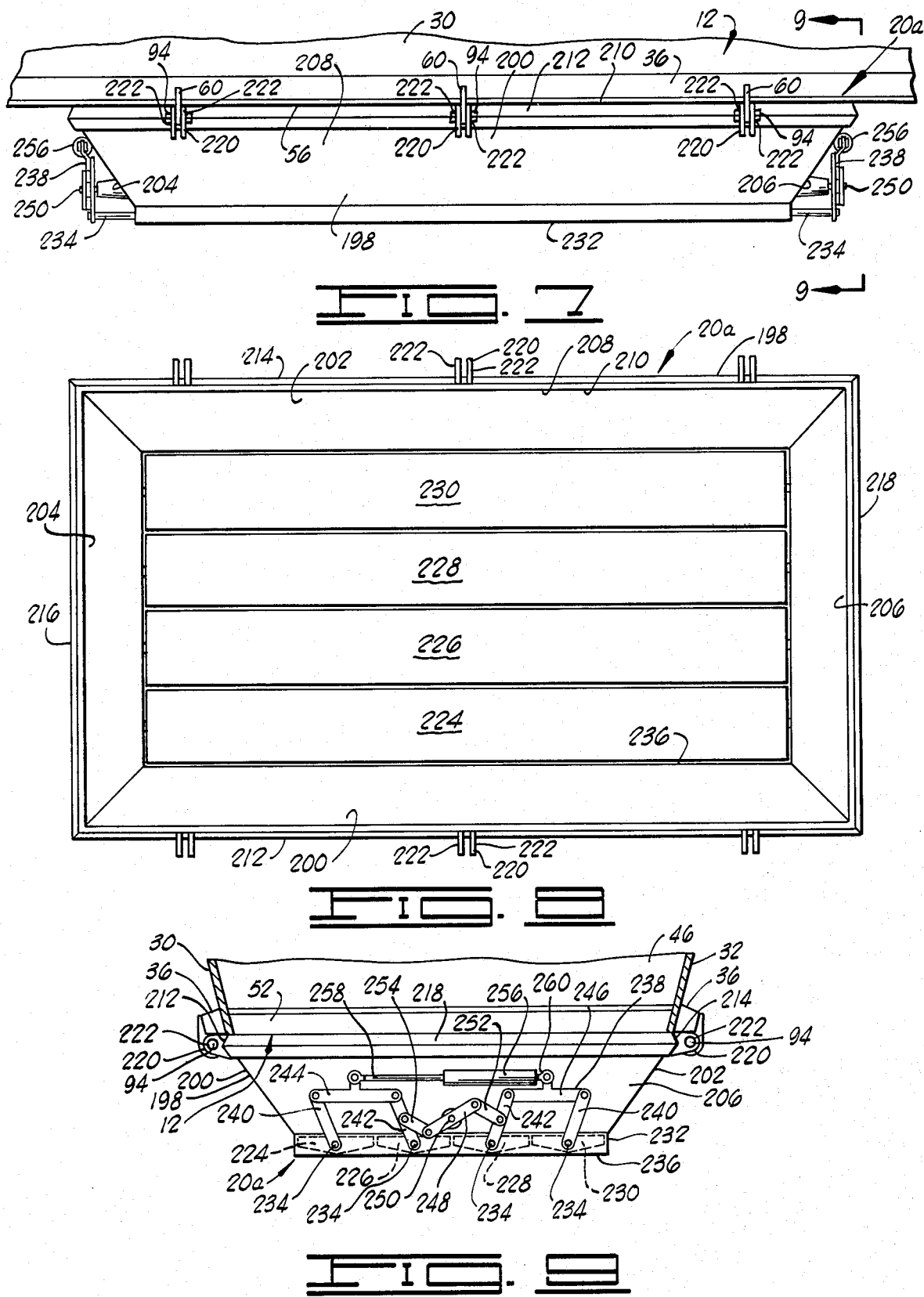

COMBINATION BOTTOM DUMP AND REAR DISCHARGE TRAILER

BACKGROUND OF THE INVENTION

1. Field of the Invention

This invention relates generally to semi-trailers for conveying and handling bulk materials and more particularly, but not by way of limitation, to semi-trailers for conveying and handling materials such as soil, gravel, crushed rock, concrete, asphalt and the like for use in the construction of road beds of highways.

2. Description of the Prior Art

The prior art contains a number of teachings of dump trucks of semi-trailers for conveying and handling bulk material in which a hopper is supported by the vehicle and a closure means is disposed beneath the hopper to alternately close and open the bottom thereof. Further, the prior art discloses a number of teachings of trucks or semi-trailers which utilize endless belt conveyors for moving the contents thereof from a hopper or the like to the rear of the vehicle for discharge therefrom.

Prior art vehicles however, display limited utility due to the fact that in each case the vehicle is restricted to either bottom dumping or rear discharging, with no means shown for providing both capabilities on a single basic trailer assembly.

SUMMARY OF THE INVENTION

The present invention generally contemplates a trailer assembly of the type which includes a frame assembly having a forward portion and a rear portion, comprising wheel means mounted on the rear portion for rollingly supporting the trailer assembly on the ground; a hopper carried by the frame assembly intermediate the forward and rear portions thereof and having an opening formed in the bottom portion thereof; and hitch means mounted on the forward portion of the frame assembly for removably securing the frame assembly to suitable tractive means.

The present invention further includes the improvement comprising gate means carried by the frame assembly and communicating with the opening in the bottom portion of the hopper for alternately opening or closing the opening in the bottom portion of the hopper. The improvement further comprises conveyor means removably securable to the frame assembly and having a forward portion positionable beneath the gate means, and a rear portion positionable above and to the rear of the wheel means, for conveying the contents of the hopper to the rear of the trailer frame assembly when the gate means is opening the bottom portion of the hopper. The present invention also includes means for removably securing the trailer means to the frame assembly whereby the conveyor means may be detached from the frame assembly so that the contents of the hopper may be dumped downwardly from the hopper to the ground when the gate means is opening the bottom portion of the hopper.

One object of the present invention is to provide a semi-trailer of light-weight construction which is capable of dumping the contents thereof either directly downwardly from the hopper, or discharging the contents of the hopper from the rear end portion thereof.

Another object of the present invention is to provide a light-weight semi-trailer which will provide the user maximum flexibility and economy from a single vehicle.

One other object of the present invention is to provide a light-weight semi-trailer which utilizes a relatively inexpensive, readily removable conveyor assembly for conveying the contents of the hopper to a discharge point at the rear end portion of the vehicle.

Yet another object of the present invention is to provide a light-weight semi-trailer for bottom dumping or rear discharge which is simple in construction, economical in operation, and inexpensive to maintain.

The foregoing and additional objects and advantages of the present invention will be more apparent as the following description is read in conjunction with the accompanying drawings.

BRIEF DESCRIPTION OF THE DRAWINGS

FIG. 1 is a side elevation view of the trailer of the present invention illustrating installation of a demountable closure assembly and a demountable conveyor assembly thereon.

FIG. 2 is a rear view of the trailer of FIG. 1 taken along line 2—2 of FIG. 1.

FIG. 3 is an enlarged side elevation view of the closure assembly illustrated in FIG. 1.

FIG. 4 is a plan view of the closure assembly housing illustrated in FIG. 3.

FIG. 5 is a plan view of the closure assembly sliding gate of the closure assembly illustrated in FIG. 3.

FIG. 6 is a rear end view of the closure assembly illustrated in FIG. 3 taken along line 6—6 of FIG. 3.

FIG. 7 is a side elevation view of an alternate embodiment of the closure assembly of the present invention.

FIG. 8 is a plan view of the closure assembly illustrated in FIG. 7.

FIG. 9 is a rear end view of the closure assembly illustrated in FIG. 7 taken along line 9—9 of FIG. 7 and illustrating the closure assembly in the closed position.

DESCRIPTION OF THE PREFERRED EMBODIMENT

Figure 10:
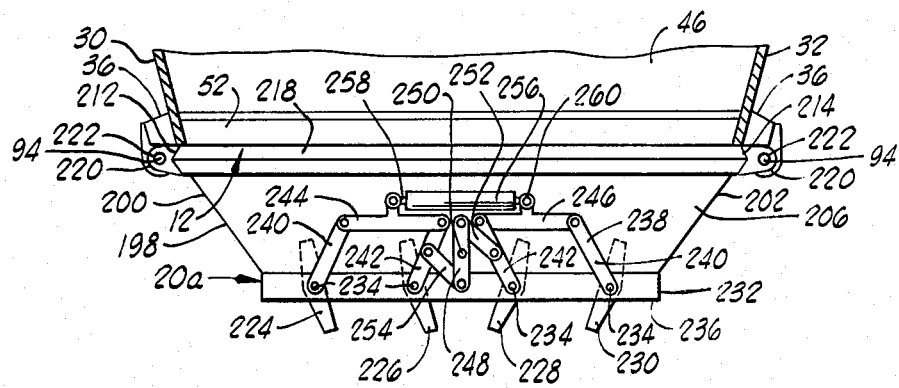
FIG. 10 is a rear end view similar to FIG. 9 illustrating the closure assembly in the open position.

Referring now to the drawings and to FIGS. 1, 2, 3, 4, 5 and 6 in particular, the apparatus of the present invention is generally designated by the reference character 10. The apparatus 10 defines a combination bottom-dump and rear discharge trailer comprising a trailer frame assembly 12, a support wheel assembly 14, a conventional trailer hitch assembly 16, a hopper 18, a demountable closure assembly 20, and a demountable conveyor assembly 22.

The conventional trailer hitch assembly 16 is mounted on the front end portion 24 of the trailer frame assembly 12 in a conventional manner to provide means for connecting the apparatus 10 to a suitable draft vehicle 26. The support wheel assembly 14 is mounted on the rear end portion 28 of the trailer frame assembly 12 to support the apparatus 10 on the ground. The frame assembly 12 includes a pair of longitudinally parallel and upwardly and slightly outwardly extending side panels 30 and 32. Each side panel 30 and 32 is preferably formed of steel sheet or plate and is suitably reinforced by means of steel channel members 34, 36, 38, 40 and 42 welded to the exterior surfaces thereof.

A front panel 44 and a rear panel 46, preferably formed of steel sheet or plate, are each disposed transversely between the side panels 30 and 32. The front and rear panels 44 and 46 are welded to the side panels 30 and 32 along their respective lines of intersection therewith. The front and rear panels 44 and 46 are each suitably reinforced by means of steel channel members 48, 50 and 52 which are welded to the outer surfaces of the respective front and rear panels 44 and 46.

The side panels 30 and 32 and the front panels 44 and 46 define the hopper 18. The hopper 18 is open at its upper end portion 54 to facilitate loading of the hopper. The lower end portion 56 of the hopper 18 terminates along the lower edge of the trailer frame assembly 12 in a substantially rectangular opening 58, which opening 58 lies in a substantially horizontal plane. The opening 58 in the lower end portion 56 of the hopper 18 is reinforced by means of the previously mentioned steel channel members 36 and 52 which are secured about the outer periphery of the opening 58.

Three steel brackets 60 are welded to the channel member 36 on each side of the opening 58. Each bracket 60 has an aperture 62 formed therein to receive a pin therethrough. A bolster 64 is secured to each channel member 52 and extends vertically downwardly therefrom. Each bolster 64 includes two pairs of aligned apertures 66 formed therein to receive a pin therethrough.

The demountable closure assembly 20 is positioned directly below the lower end portion 56 of the hopper 18. The closure assembly 20 includes a housing 68 comprising a pair of longitudinally parallel side panels 70 and 72, a front panel 74 and a rear panel 76. The panels 70, 72, 74 and 76 are preferably formed of steel sheet or plate and are welded together to form the housing 68.

The upper end portion 78 of the housing 68 has a rectangular opening 80 formed therein which is sized to communicate with the opening 58 in the lower end portion 56 of the hopper 18. The opening 80 is reinforced by means of four steel channel members 82, 84, 86 and 88 welded to the respective upper margins of the panels 70, 72, 74 and 76 about the outer periphery of the opening 80.

Three sets of double brackets 90 are welded to each of the steel channel members 82 and 84. Each double bracket 90 includes a pair of horizontally aligned apertures 92 formed therein. When the housing 68 is properly positioned beneath the hopper 18 it is conveniently secured thereto by means of six pins 94 passing through the respective apertures 92 and 62 of the respective brackets 90 and 60. The six pin connections between the housing 68 and the trailer frame assembly 12 permit the easy attachment and detachment of the demountable closure assembly 20 to and from the trailer frame assembly 12.

Four spaced parallel baffle panels 96, 98, 100 and 102 extend substantially horizontally across the interior of the housing 68. Each of the baffle panels 96, 98, 100 and 102 has a triangular cross-sectional shape. The spacings between adjacent baffle panels and between baffle panel 96 and front panel 74 of the housing 68 and baffle panel 102 and the rear panel 76 of the housing 68 are substantially equal thereby providing five transversely parallel openings 104 of equal width and length extending across the bottom portion 106 of the housing 68.

The closure assembly 20 further includes a sliding gate 108 positioned beneath the bottom portion 106 of the housing 68. The sliding gate 108 includes a rectangular open frame 110 having dimensions substantially equivalent to the rectangular dimensions of the bottom portion 106 of the housing 68. Five parallel gate panels 112, 114, 116, 118 and 120 extend substantially horizontally across the open frame 110 forming four openings 122, 124, 126 and 128 in the sliding gate 108.

The sliding gate 108 is slidingly supported beneath the housing 68 by means of six brackets 130 formed along the lower margin of each side panel 70 and 72 in spaced relation. The sliding gate 108 is adapted to slide longitudinally in the brackets 130 relative to the bottom portion 106 of the housing 68.

A pair of hydraulic cylinders 132 are disposed respectively on each side of the sliding gate 108. Each hydraulic cylinder 132 is aligned substantially parallel to the longitudinal axis of the trailer frame assembly 12. One end portion 134 of each hydraulic cylinder 132 is secured to the frame 110 of the sliding gate 108 by means of a bracket 136 formed on the frame 110. The opposite end portion 137 of each hydraulic cylinder 132 is connected to the housing 68 by means of two brackets 133.

It will be seen that by alternately extending and retracting the hydraulic cylinders 132, the sliding gate 108 will be moved longitudinally relative to the housing 68. When the hydraulic cylinders 132 are fully extended, the openings 104 in the bottom portion 106 of the housing 68 are in registry with the parallel gate panels 112, 114, 116, 118 and 120 of the sliding gate 108. In this position the closure assembly 20 is in a closed position.

As the hydraulic cylinders 132 are progressively retracted, the sliding gate 108 is moved longitudinally forward relative to the housing 68 and the parallel gate panels 112, 114, 116, 118 and 120 are moved progressively out of registration with the openings 104 in the bottom portion 106 of the housing 68 thereby progressively opening the closure assembly 20.

In the preferred embodiment, the widths of the parallel gate panels 118 and 120 are substantially equal to the widths of the parallel openings 104 in the bottom portion 106 of the housing 68. The width of the parallel gate panel 116 is approximately 33⅓ percent wider than the width of the corresponding parallel opening 104 in the bottom portion 106 of the housing 68. The gate panels 112 and 114 are each approximately 66⅔ percent wider than the width of the corresponding parallel openings 104 in the bottom portion 106 of the housing 68. The forward edges 138, 140, 142, 144 and 146 of the respective parallel gate panels 112, 114, 116, 118 and 120 are equally spaced along the longitudinal axis of the apparatus 10.

The width and spacing relationship of the parallel gate panels 112, 114, 116, 118 and 120 described above causes the openings 104 in registry with the gate panels 118 and 120 to open first as the sliding gate 108 is progressively moved forward by the retraction of the hydraulic cylinders 132. Similarly, the parallel gate panel 116 begins to open the corresponding parallel opening 104 in the bottom portion of the housing 68 when the gate panels 118 and 120 have opened their corresponding openings 104 approximately one-third. The gate panels 112 and 114 begin opening their corresponding openings 104 in the bottom portion 106 of the housing 68 when the gate panels 118 and 120 have opened their corresponding openings 104 approximately two-thirds and the gate panel 116 has opened its corresponding opening 104 approximately one-third its maximum openings.

It will be readily apparent that this graduated opening of the closure assembly 20 permits the rearwardly disposed openings 104 of the housing 68 to begin discharging the material contained in the hopper 18 before the forwardly disposed openings 104 begin to similarly discharge the contents of the hopper 18.

The demountable conveyor assembly 22 is partially disposed beneath the closure assembly 20 and extends rearwardly and slightly upwardly therefrom to a position within the trailer frame assembly 12 and above the support wheel assembly 14. The conveyor assembly 22 includes an elongated rigid frame assembly 148 fabricated of steel members and including a forward portion 150, a medial portion 152, and a rear portion 154. The forward portion 150 of the frame assembly 148 is supported beneath the trailer frame assembly 12 by means of four upwardly extending struts 156 which are secured at the upper ends thereof 158 to the respective bolsters 64 by means of pins 160 extending through the respective apertures 66 in the bolsters 64 and through corresponding apertures 162 formed respectively in the upper end 158 of each strut 156.

The rear portion 154 of the conveyor frame assembly 148 is removably secured to the trailer frame assembly 12 by means of four pins 164 each extending through a corresponding bracket 166 welded to the rear portion 154 and having a pin-receiving aperture 168 formed therethrough and a corresponding bracket 170 welded to the trailer frame assembly 12 and having a similar pin-receiving aperture 172 formed therethrough. There are two of the above described pin connections on each side of the rear portion 154 of the conveyor frame assembly 148.

An endless Neoprene conveyor belt 174 is carried by the conveyor frame assembly 148. The belt 174 extends longitudinally the full length of the conveyor assembly 148 and has a width approximately equal to the transverse width of the sliding gate 108. The belt 174 passes over a tail pulley 176 journaled transversely on the forward end 178 of the frame assembly 148. The conveyor belt 174 also passes over a head pulley 180 journaled transversely on the rear end 182 of the conveyor frame assembly 148.

The upper side 184 of the conveyor belt 174 is rollingly supported by a plurality of flexible rollers 186 transversely journaled on the upper side of the conveyor frame assembly 148 and extending beneath the upper side 184 of the conveyor belt 174. The flexible rollers 186 are adapted to allow the upper side 184 of the conveyor belt 174 to form a trough when supporting the weight of the material to be conveyed thereby. The lower side 188 of the conveyor belt 174 is directed and controlled by a plurality of rollers 190 transversely journaled on the lower side of the conveyor frame assembly 148.

The tension of the conveyor belt 174 on the conveyor frame assembly 148 is controlled by a pair of longitudinally aligned screw jacks 192 disposed on each side of the conveyor frame assembly 148 for supporting and adjusting the longitudinal positioning of the tail pulley 176 relative to the conveyor frame assembly 148.

The head pulley 180 is drivingly connected through a suitable gear reducer 194 to a hydraulic drive motor 196.

The hydraulic motor 196 of the conveyor assembly 22 and the hydraulic cylinders 132 of the closure assembly 20 are suitably connected by means of hydraulic conduits (not shown) to suitable hydraulic controls located either on the apparatus 10 or on the draft vehicle 26, or on both. The hydraulic control system is in turn suitably connected to a source of pressurized hydraulic fluid carried either on the apparatus 10 or on the draft vehicle 26.

Figure 13:
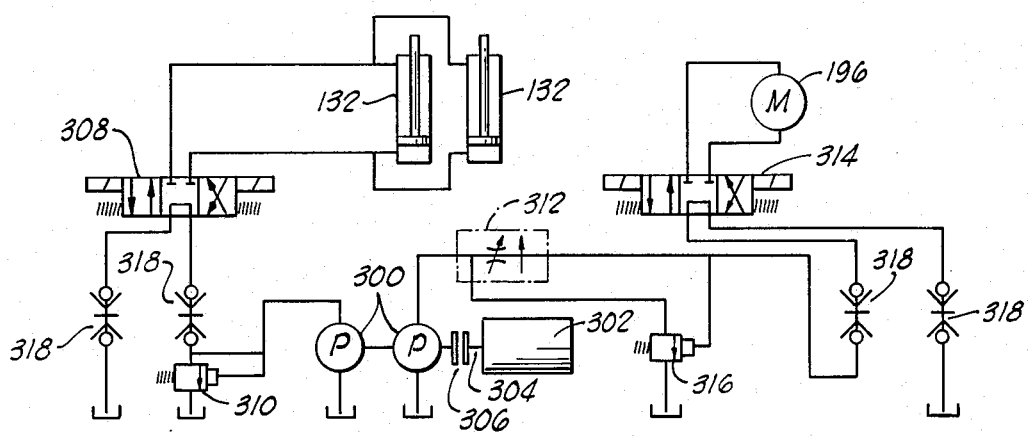
FIG. 13 is a schematic diagram of a control system for use with the present invention.

A typical hydraulic control system suitable for use with the present invention is illustrated in FIG. 13. The system includes a hydraulic pump 300 driven by a suitable drive motor 302 through a drive shaft 304 which includes a clutch 306. The pump 300 is connected by means of a suitable conduit to a directional control valve 308. The directional control valve 308 is connected by means of a pair of suitable conduits to the power cylinders 132 on the closure assembly 20. A pressure release valve 310 is provided between the directional control valve 308 and the pump 300 to vent hydraulic fluid to the hydraulic fluid reservoir in the even of overpressure.

The pump 300 is also connected by means of a suitable conduit to an adjustable flow control valve 312 which is interposed between the pump 300 and a second directional control valve 314. The directional control valve 314 is connected by means of two suitable conduits to the hydraulic drive motor 196 on the conveyor assembly 22. A pressure relief valve 316 is also interposed between the pump 300 and the directional control valve 314 to vent hydraulic fluid to the hydraulic fluid reservoir in the event of overpressure.

Both the directional control valves 308 and 314 are connected by respective return conduits to the hydraulic fluid reservoir. It will be noted that the control system may be suitably equipped with quick-disconnect connectors in the previously mentioned conduits as illustrated by reference character 318 to permit the previously described installation and removal of the demountable closure assembly 20 and the demountable conveyor assembly 22 with which the control system is associated.

OPERATION OF THE PREFERRED EMBODIMENT

To operate the apparatus 10, the hydraulic cylinders 132 are first fully extended to position the sliding gate 108 in proper position to close the closure assembly 20. The hopper 18 may then be filled with a suitable material to be transported by the apparatus 10, such as hot mix asphalt or the like.

When the apparatus 10 is at the site for unloading the cargo carried therein, the operator actuates the control system (not shown) to start the hydraulic drive motor 196 and in turn drive the conveyor belt 174 such that the uppr side 184 thereof moves continuously to the rear of the apparatus 10.

The operator then actuates the control system to begin progressively retracting the hydraulic cylinders 132 to progressively open the closure assembly 20 thereby allowing the contents of the hopper 18 to begin discharging through the closure assembly 20 onto the rearwardly moving upper side 184 of the conveyor belt 174. The operator can vary the speed of the conveyor assembly 22 and the discharge rate through the closure assembly to obtain the desired rate of discharge of material from the hopper 18 at the rear end of the apparatus 10.

It will be readily apparent that the extension and retraction of the power cylinders 132 may be controlled by the actuation of the directional control valve 308. The directional control valve 308 may be controlled manually or by means of hydraulic or electrical signals applied thereto. Similarly, the direction of rotation of the hydraulic drive motor 196 will be controlled by actuation of the direction control valve 314 by either manual means or the application of hydraulic or electrical signals thereto. The rotational speed of the hydraulic drive motor 196 will be controlled by the adjustable flow control valve 312 which also may be actuated by manual means or through the actuation of hydraulic or electrical signals thereto.

When a sufficient amount of material has been discharged from the hopper 18, the operator then causes the hydraulic cylinders 132 to be fully extended thereby closing the closure assembly 20 and cutting off material discharge therethrough. The conveyor assembly 22 is allowed to continue running until all of the material on the upper side 184 of the conveyor belt 174 has been dumped from the rear end of the apparatus 10.

In the event the apparatus 10 is to be used as a bottom dump trailer, the demountable conveyor assembly 22 may be removed from the trailer frame assembly 12 by disconnecting the hydraulic conduits from the drive motor 196, removing the four pins 160 supporting the forward portion 150 of the conveyor frame assembly 148 and by removing the four pins 164 securing the rear portion 154 of the conveyor frame assembly 148 to the trailer frame assembly. The conveyor assembly 22 may then be removed through the rear end portion of the trailer frame assembly 12.

Bottom dumping may then be accomplished by the operator by merely retracting the hydraulic cylinders 132 the desired amount to allow material to flow from the hopper 18 through the closure assembly 20.

DESCRIPTION OF THE EMBODIMENT OF FIGS. 7, 8, 9 AND 10

An alternate form of demountable closure assembly 20a is illustrated in FIGS. 7, 8, 9 and 10. The closure assembly 20a is positioned directly below the lower end portion 56 of the hopper 18 in a manner similar to previously described closure assembly 20. The closure assembly 20a includes a housing 198 comprising a pair of longitudinally parallel side panels 200 and 202, a front panel 204 and a rear panel 206. The panels 200, 202, 204 and 206 are preferably formed of steel sheet or plate and are welded together to form the housing 198.

The upper end portion 208 of the housing 198 has a rectangular opening 210 formed therein which is sized to communicate with the opening 58 in the lower end portion 56 of the hopper 18. The opening 210 is reinforced by means of four steel channel members 212, 214, 216 and 218 welded to the respective upper margins of the panels 200, 202, 204 and 206 about the outer periphery of the opening 210.

Three sets of double brackets 220 are welded to each of the steel channel members 212 and 214. Each double bracket 220 includes a pair of horizontally aligned apertures 222 formed therein. When the housing 198 is properly positioned beneath the hopper 18 it is conveniently secured thereto by means of six pins 94 passing through the respective apertures 222 and 62 of the respective brackets 220 and 60. The six pin connections between the housing 198 and the trailer frame assembly 12 permit the easy attachment and detachment of the demountable closure assembly 20a to and from the trailer frame assembly 12.

Four elongated gate members 224, 226, 228 and 230 are disposed in the lower portion 232 of the housing 198. The gate members 224, 226, 228 and 230 are each journally supported within the housing 198 by means of shafts 234 extending from the opposite ends thereof through the respective front and rear panels 204 and 206 of the housing 198. Each of the gate members is rotatable about an axis substantially parallel to the longitudinal axis of the trailer frame assembly 12. Each gate member has a substantially planar upper surface and is rotatable about its axis between a position in which its upper surface is substantially horizontal thereby closing a portion of the opening 236 in the lower portion 232 of the housing 198 and a position in which the planar upper surface thereof approaches a substantially vertical alignment thereby opening a portion of the opening 236 in the housing 198.

The gate members 224, 226, 228 and 230 are interconnected at each end by means of a linkage assembly 238 secured to the respective shafts 234 of the gate members. The linkage assembly 238 includes two crank arms 240 fixedly secured respectively to the shafts 234 of the gate members 224 and 230. Similarly, two crank arms 242 are fixedly secured respectively to the shafts 234 of the gate members 226 and 228. The outer ends of adjacent crank arms 240 and 242 are pivotally secured to and interconnected by respective drag links 244 and 246. A synchronizing link 248 is pivotally secured at its medial portion 250 to the housing 198 and is adapted to rotate about an axis parallel to the shafts 234. One end of the link 248 is pivotally secured to one end of the link 252 which in turn is pivotally secured at the opposite end thereof to crank arm 242 associated with gate member 228. The opposite end of link 248 is pivotally secured to one end of link 254 which is pivotally secured at the opposite end thereof to crank arm 242 associated with gate member 226.

The linkage assembly 238 is actuated by a two-way hydraulic cylinder 256 connected at one end thereof 258 to drag link 242 and connected at the opposite end thereof 260 to the drag link 246. When the two-way hydraulic cylinder 256 is fully extended, as illustrated in FIG. 9, the gate members 224, 226, 228 and 230 are in positions fully closing the opening 236 in the lower portion 232 of the housing 198. Alternately, when the hydraulic cylinder 256 is fully retracted, as illustrated in FIG. 10, the gate members 224, 226, 228 and 230 are rotated on their respective shafts 234 to positions opening the lower portion 232 of the housing 198. It will be understood that the linkage assembly 238 is identical at each end of the demountable closure assembly 20a, therefore only one end of the closure assembly 20a has been illustrated in detail.

It should be noted that by varying the relative lengths of the crank arms 240 and 242 in the linkage assembly 238, the relative opening rate of the gate members 224, 226, 228 and 230 may be correspondingly varied. It has been found that it may be advantageous to construct the linkage assembly 238 with the crank arms 240 having a length slightly greater than the length of the crank arms 242 thereby causing the gate members 226 and 228 to open at a slightly greater rate than the gate members 224 and 230 as the hydraulic cylinder 256 is progressively retracted.

DESCRIPTION OF THE EMBODIMENT OF FIGS. 11 AND 12

Figure 11:
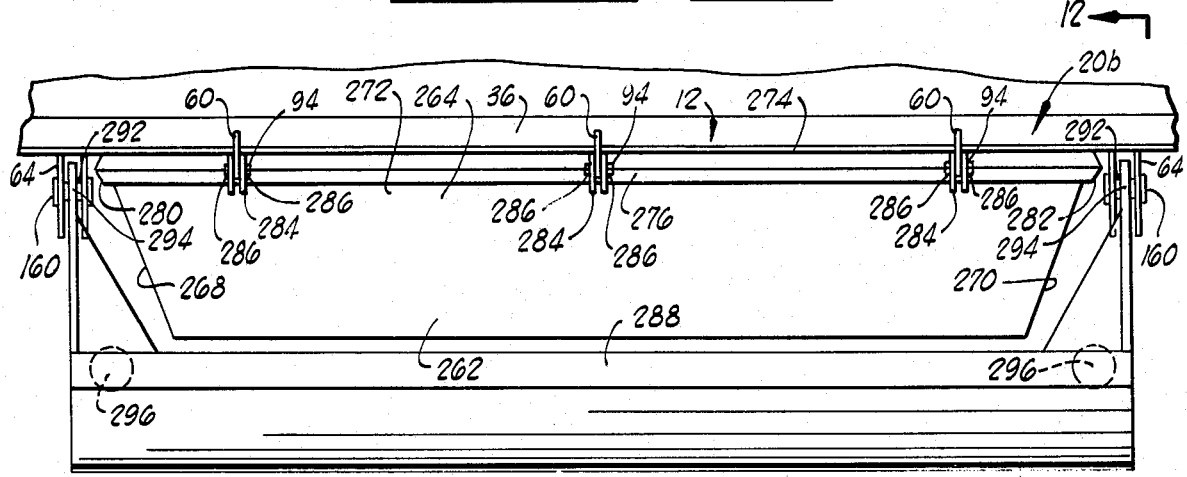
FIG. 11 is a side elevation view of another form of closure assembly.
Figure 12:
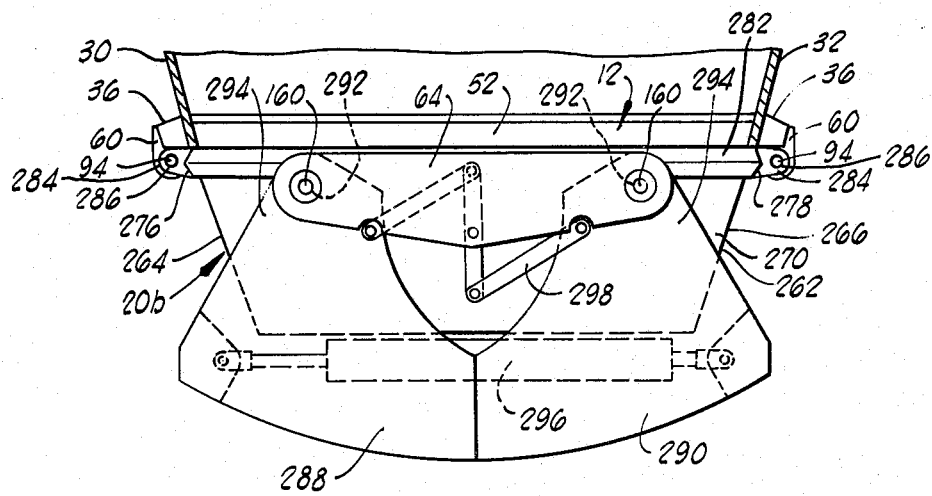
FIG. 12 is a rear end view of the closure assembly illustrated in FIG. 11 taken along line 12—12 of FIG. 11.

FIGS. 11 and 12 illustrate a third form of demountable closure assembly 20b for attachment to the trailer frame assembly 12 directly below the lower end portion 56 of the hopper 18 when it is desired to use the apparatus 10 with the conveyor assembly 22 removed therefrom. The closure assembly 20b provides a conventional clamshell type bottom dumping gate structure.

The closure assembly 20b includes a housing 262 comprising a pair of longitudinally parallel side panels 264 and 266, a front panel 268 and a rear panel 270. The panels 264, 266, 268 and 270 are preferably formed of steel sheet or plate and are welded together to form the housing 262.

The upper end portion 272 of the housing 262 has a rectangular opening 274 formed therein which is sized to communicate with the opening 58 in the lower end portion 56 of the hopper 18. The opening 274 is reinforced by means of four steel channel members 276, 278, 280 and 282 welded to the respective upper margins of the panels 264, 266, 268 and 270 about the outer periphery of the opening 274.

Three sets of double brackets 284 are welded to each of the steel channel members 276 and 278. Each double bracket 284 includes a pair of horizontally aligned apertures 286 formed therein. When the housing 262 is properly positioned beneath the hopper 18 it is conveniently secured thereto by means of six pins 94 passing through the respective apertures 286 and 62 of the respective brackets 284 and 60. The six pin connections between the housing 262 and the trailer frame assembly 12 permit the easy attachment and detachment of the housing 262 of the demountable closure assembly 20b to and from the trailer frame assembly 12.

First and second clamshell closure members 288 and 290 are each pivotally secured to the bolsters 64 on the trailer frame assembly 12 by means of pins 160 extending through the respective aperture 66 in the bolsters 64 and through corresponding apertures 292 formed in the upper portions 294 of the clamshell members 288 and 290. A two-way power cylinder 296 interconnects the clamshell closure members 288 and 290 at each end thereof. When the power cylinders 296 are extended, the closure members 288 and 290 swing outwardly about their pivotal connections to the bolsters 64 thereby opening the closure assembly 20b. Alternately, when the power cylinders 296 are retracted the closure members 288 and 290 swing inwardly about their pivotal connections thereby closing the closure assembly 20b. A suitable linkage assembly 298 interconnects the closure members 288 and 290 and the respective bolsters 64 at each end of the closure assembly 20b to synchronize the opening and closing movements of the clamshell closure members 288 and 290.

DESCRIPTION OF THE EMBODIMENT OF FIG. 14

Figure 14:
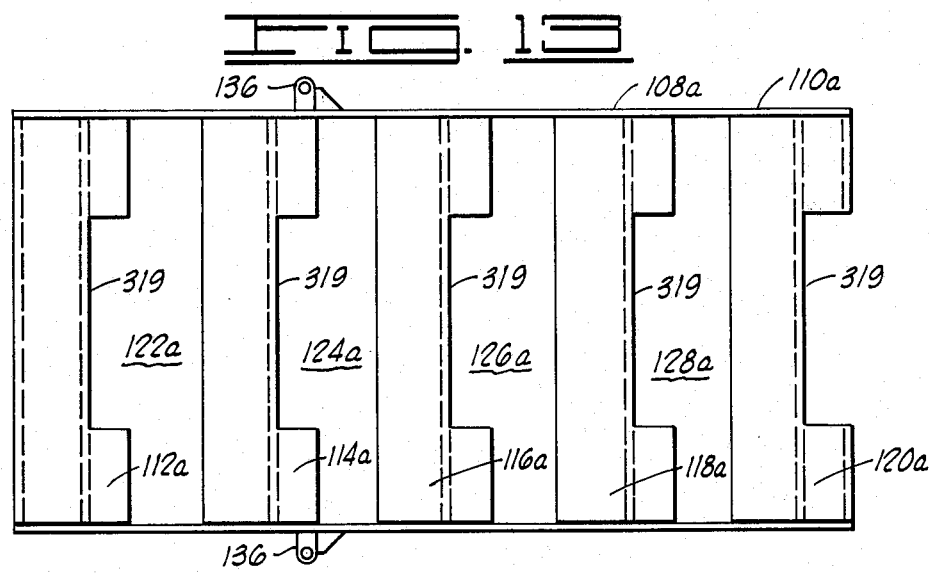
FIG. 14 is a plan view of another form of closure assembly sliding gate similar to that illustrated in FIG. 5.

FIG. 14 illustrates a slightly modified sliding gate 108a for use with the closure assembly 20 in a manner similar to that previously described for the sliding gate 108. The sliding gate 108a includes a substantially rectangular open frame 110a having dimensions substantially equivalent to the rectangular dimensions of the bottom portion 106 of the housing 68. Five parallel gate panels 112a, 114a, 116a, 118a and 120a extend substantially horizontally across the open frame 110a forming four openings 122a, 124a, 126a and 128a in the sliding gate 108a. The frame 110a includes a pair of brackets 136 formed respectively on each side thereof for connection with the hydraulic cylinders 132 in the manner as previously described in detail for the sliding gate 108.

Each of the gate panels 112a, 114a, 116a, 118a and 120a is provided with a rectangularly shaped open portion or notch 319 communicating with the rearward edge thereof. Each notch 319 is preferably laterally centered in the respective gate panel and has a lateral dimension approximately one-half that of the respective gate panel.

The notches 319 in the gate panels of the sliding gate 108a are sized to provide gradual metering of the contents from the hopper 18 as the sliding gate 108a begins to open the closure assembly 20 in response to the retraction of the power cylinders 132. It will be readily apparent that as the sliding gate 108a is gradually opened, the medial portion of each parallel gate panel will open before the outer portions of the gate panels begin to open. This particular characteristic of the sliding gate 108a prevents an excessive amount of material from the hopper 18 being dumped on the moving conveyor belt 174 which could overload the hydraulic drive motor 196. This capability is most important in view of the characteristics of certain materials, such as hot mix asphalt, to bridge in the hopper thereby inhibiting free flow of the material through the closure assembly until a rather large opening has been provided by the gate.

DESCRIPTION OF THE EMBODIMENT OF FIG. 15

Figure 15:
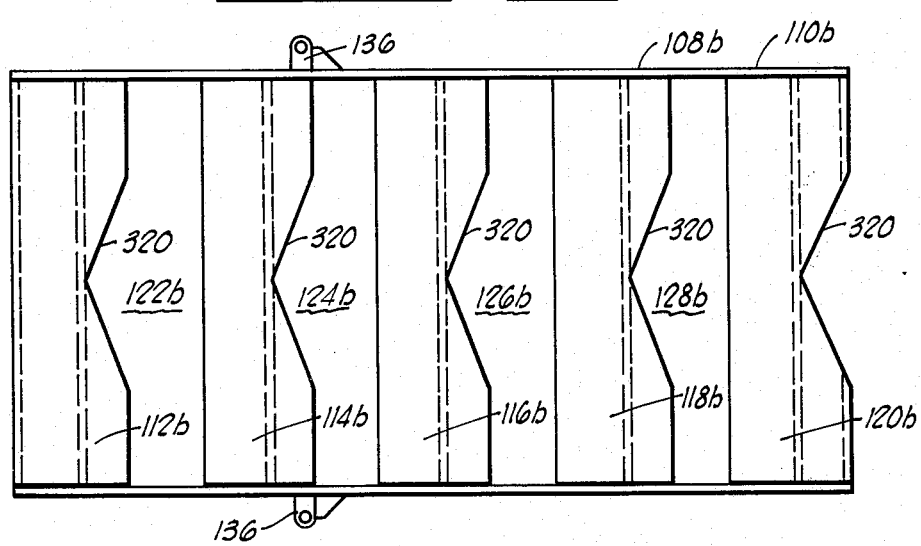
FIG. 15 is a plan view of an alternate form of closure assembly sliding gate similar to that illustrated in FIG. 14.

FIG. 15 illustrates another form of sliding gate 108b which differs slightly from the sliding gate 108a. As in the sliding gate 108a, the sliding gate 108b includes a substantially rectangular frame 110b on which are carried parallel gate panels 112b, 114b, 116b, 118b and 120b. The gate panels are separated by openings 122b, 124b, 126b and 128b. The gate panels 112b, 114b, 116b, 118b and 120b differ from the gate panels of the previously described gate 108a in that they are each equipped with a V-shaped opening or notch 320 communicating with the rearward edge thereof.

The advantage of the sliding gate 108b over the sliding gate 108 is identical to the advantage previously described for the sliding gate 108a in that more precise matering of the contents of the hopper 18 being dumped on the conveyor belt 174 is obtained by opening the closure assembly 20 along its longitudinal axis before opening it along its lateral extremities. The operation of the sliding gate 108b is identical to that previously described for the sliding gates 108 and 108a.

DESCRIPTION OF THE EMBODIMENT OF FIG. 16

Figure 16:
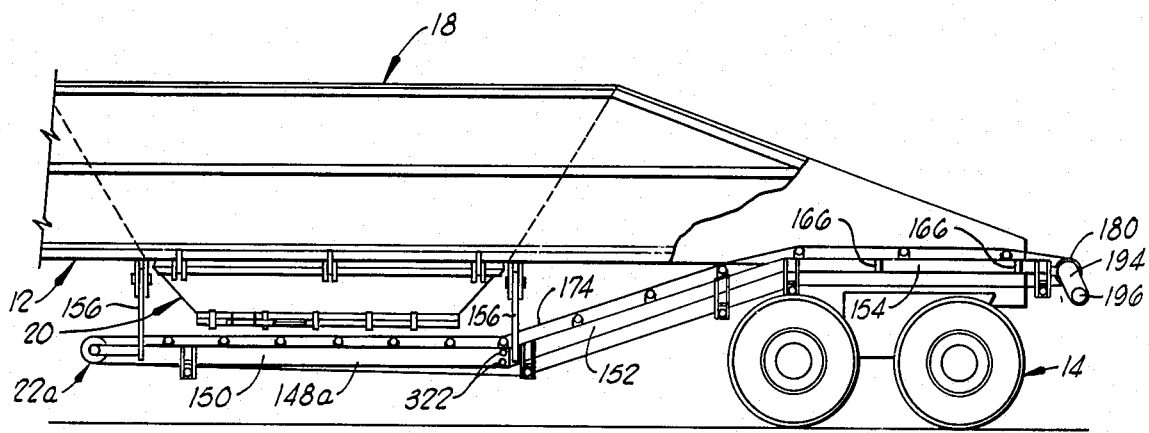
FIG. 16 is a partial side elevation view of the trailer of the present invention illustrating a slightly modified demountable conveyor assembly.

FIG. 16 illustrates a slightly modified demountable conveyor assembly 22a which includes a slightly modified frame assembly 148a. The frame assembly 148a differs from the previously described frame assembly 148 in that the forward portion 150 thereof and the medial portion 152 thereof are demountably secured together by means of pin connections 322 at each side of the frame assembly 148a. This construction permits the forward portion 150 of the frame assembly 148a to be folded to facilitate installation of the conveyor belt 174. This structure also permits the forward portion 150 of the frame assembly 148a to be removed entirely from beneath the closure assembly 20 to permit the contents of the hopper 18 to be dumped to the ground in the unlikely event of a mechanical malfunction in the conveyor assembly 22a, or when otherwise desired. The operation of the conveyor assembly 22a is substantially identical to the operation of the conveyor assembly 22 described above.

DESCRIPTION OF THE EMBODIMENT OF FIGS. 17 AND 18

Figure 17:
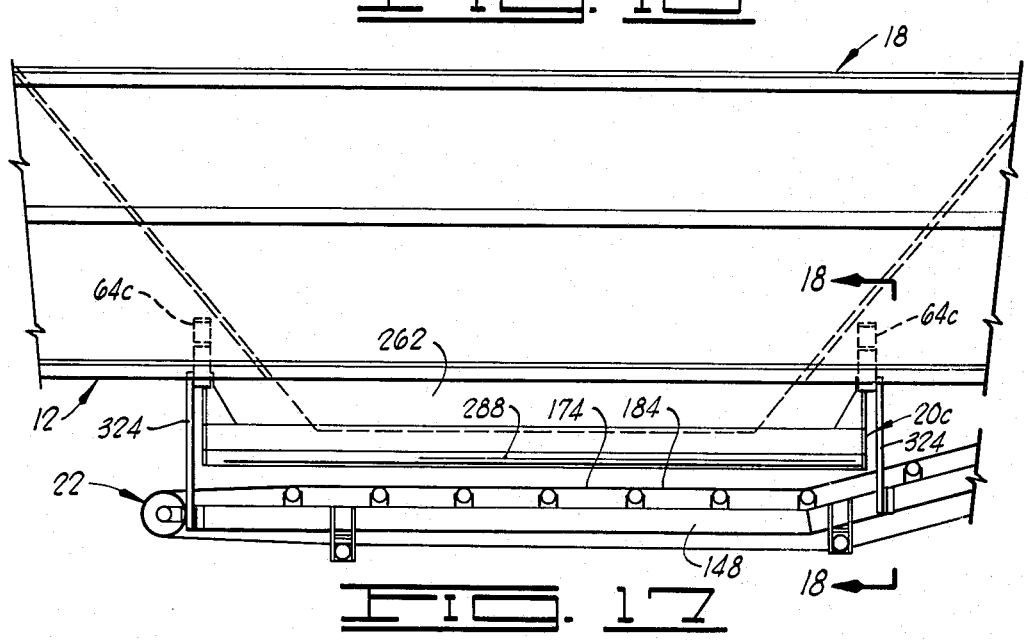
FIG. 17 is a partial side elevation view of an alternate form of the trailer of the present invention employing a clamshell type closure assembly in combination with the demountable conveyor assembly.
Figure 18:
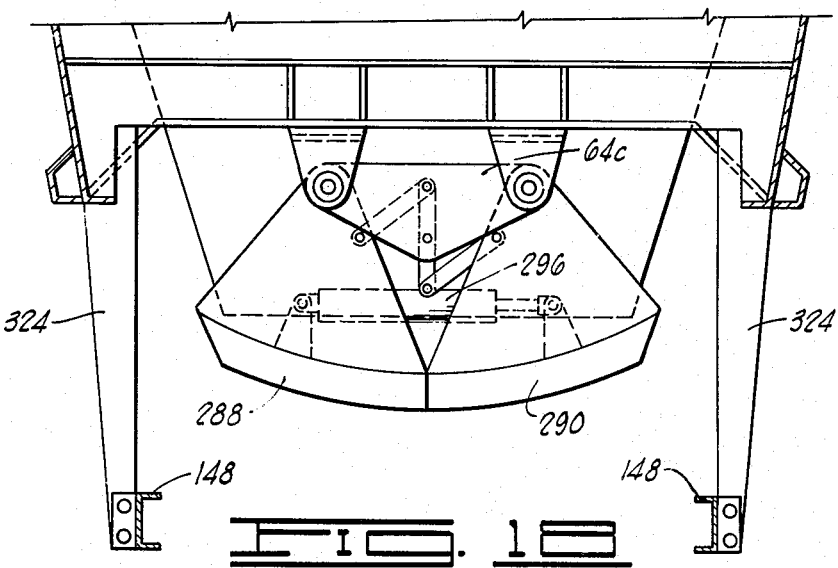
FIG. 18 is a cross-sectional view taken along line 18—18 of FIG. 17.

FIGS. 17 and 18 illustrate a slightly modified apparatus 10a employing a modified demountable closure assembly 20c in combination with the demountable conveyor assembly 22.

The closure assembly 20c is substantially identical to the previously described closure assembly 20b and includes the housing 262 secured to the trailer frame assembly 12 in the manner as described above. The first and second clamshell closure members 288 and 290 are each pivotally secured to slightly modified bolsters 64c which are fixedly secured to the trailer frame assembly 12.

The demountable conveyor assembly 22 is supported beneath the housing 262 and the clamshell members 288 and 290 by means of four struts 324. The upper end of each strut 324 is rigidly secured to the trailer frame assembly 12 and the lower end of each strut 324 is rigidly secured to the frame assembly 148 by suitable means such as bolts which facilitates the installation and removal of the demountable conveyor assembly 22 on the trailer frame assembly 12.

OPERATION OF THE EMBODIMENT OF FIGS. 17 AND 18

To operate the apparatus 10b, the conveyor 22 is first placed in motion with the upper side 184 of the conveyor belt 174 moving rearwardly. The clamshell closure members 288 and 290 are then gradually opened by extending the power cylinders 296 until the contents of the hopper 18 begin to discharge downwardly onto the moving conveyor belt 174. By gradually opening the clamshell closure members 288 and 290 the contents of the hopper 18 may be precisely metered onto the conveyor belt 174 thereby preventing the overloading of the conveyor assembly 22 and minimizing the power requirements thereof.

It will be readily seen that the various closure assembly configurations described above for use with a demountable conveyor assembly employing an endless Neoprene conveyor belt provide an important capability in that the contents of the hopper 18 of the apparatus 10 will be supported by the closure assembly beneath the hopper and above the conveyor belt at all times except when the contents of the hopper are being dumped from the rear of the apparatus 10 by means of the conveyor belt. This structure permits the conveyor belt to be driven with a minimum expenditure of power since the conveyor belt will not be called upon to begin operation from a stopped position while supporting all or a major portion of the weight of the contents in the hopper as is characteristic of some known prior art devices.

Similarly, the apparatus described herein permits the utilization of a relatively inexpensive Neoprene conveyor belt for the handling of hot and corrosive materials such as hot mix asphalt. This capability of the present invention is provided again due to the fact that the hot and corrosive materials are supported within the hopper by means of the closure assembly at all times except during the actual discharge of the material from the hopper and movement of the material by the conveyor belt.

While the foregoing detailed description of the present invention envisions the utilization of a semitype trailer frame assembly as the support means for the various forms of closure assemblies and the conveyor assembly, it will be readily apparent to those skilled in the art that such apparatus may, in certain applications, be advantageously constructed on a self-propelled vehicle chassis without departing from the spirit and scope of the invention. Furthermore, it may be advantageous in certain applications to secure more than one apparatus 10 to a draft vehicle for over the road hauling in states where the law permits.

It will be seen also from the foregoing detailed description of the present invention that the apparatus described therein readily obtains the objectives set forth herein. Changes may be made in the construction and arrangement of parts or elements of the various embodiments described herein without departing from the spirit and scope of the present invention as defined herein.

What is claimed is:

1. In an apparatus for transporting particulate materials or the like which includes a frame assembly having a forward portion and a rear portion, wheel means mounted on the rear portion for supporting the apparatus on the ground, and a hopper carried by the frame assembly intermediate the forward and rear portions thereof and having an opening formed in the bottom portion thereof, the improvement comprising:

a housing disposed between the hopper having upper and lower openings formed respectively in the upper and lower portions thereof, the upper opening thereof communicating with the opening in the bottom portion of the hopper;

a plurality of spaced parallel baffle panels extending substantially horizontally across the lower portion of the housing and forming thereby a plurality of substantially equally spaced parallel openings of substantially equal width therebetween;

slide gate frame means having a forward portion and a rearward portion and slidably disposed beneath and adjacent to the lower portion of the housing for substantially horizontal movement relative to the housing;

a plurality of spaced parallel gate panels extending substantially horizontally across the slide gate frame means in substantial parallel alignment with the plurality of baffle panels and forming a plurality of spaced parallel openings therebetween through the slide gate frame means, the forward edges of adjacent spaced parallel gate panels being substantially equally spaced, said spacing being substantially equal to the spacing between adjacent spaced parallel openings between said parallel baffle panels, and the width of each parallel gate panel at the medial portion thereof being less than the width at the opposite ends thereof adjacent to the slide gate frame means, the width at the medial portion of each gate panel being at least as great as the width of each spaced parallel opening between said spaced parallel baffle panels, and the width of said medial portion of the parallel gate panels adjacent to the forward portion of the slide gate frame means being greater than the width of the medial portion of the parallel gate panel adjacent to the rear portion of the slide gate frame means, the width of the latter parallel gate panel being substantially equal to the width of the spaced parallel openings between the spaced parallel baffle panels whereby an even flow of material from the hopper is discharged through the openings;

actuation means for moving the slide gate frame means alternately between a closed position wherein the spaced parallel gate panels register with and close the respective spaced parallel openings between the plurality of spaced parallel baffle panels and an open position wherein the spaced parallel gate panels register with the respective plurality of spaced parallel baffle panels and open the plurality of spaced parallel openings therebetween;

control means operatively connected to the actuation means for controlling the operation of the actuation means in response to an external stimulus;

conveyor means, having one end portion thereof disposed beneath the plurality of spaced parallel openings in the housing and having the opposite end portion disposed a distance from the spaced parallel openings for conveying the contents of the hopper thereon from the first end portion to the opposite end portion when the slide gate frame means is in the open position, the opposite end portion of the conveyor means being disposed to the rear of the wheel means whereby the contents of the hopper are conveyed to the rear of the frame assembly, the conveyor means further being removably securable to the frame assembly; and, means for removably securing the conveyor means to the frame assembly whereby the conveyor means may be detached from the frame assembly so that the contents of the hopper may be dumped downwardly from the hopper to the ground when the slide gate frame means is in the open position.

2. The apparatus as defined in claim 1 wherein the conveyor means is characterized further to include:

a conveyor frame having a forward portion and a rear portion, and being removably securable to the frame assembly with the forward portion thereof positioned beneath the housing and the rear portion thereof positioned above and to the rear of the wheel means;

conveyor belt means carried by said conveyor frame and extending between the forward and rear portions thereof for conveying the contents of the hopper thereon to the rear of the frame assembly when the slide gate means is in the open position; and, drive means operatively coupled to the conveyor belt means for driving the conveyor belt means whereby the contents of the hopper are conveyed thereon to the rear of the trailer frame assembly and discharged therefrom.

3. The apparatus as defined in claim 2 wherein the actuation means is characterized further to include:

power cylinder means operatively connected to the slide gate frame means for moving the slide gate frame means selectively between the closed position and the open position relative to the housing in response to the control means.

4. The apparatus as defined in claim 3 wherein said slide gate frame means is movable along an axis substantially parallel to the longitudinal axis of the frame assembly.

* * * * *